(12) United States Patent
Chun et al.

(10) Patent No.: US 6,366,649 B1
(45) Date of Patent: Apr. 2, 2002

(54) METHOD AND APPARATUS FOR MANAGING VOICE REGISTRATION ENTRIES OF VOICE RECOGNITION APPARATUS FOR USE IN BOTH HANDSET AND HANDS-FREE KIT

(75) Inventors: Kyung-Joon Chun, Seoul; Seo-Yong Chin, Kyonggi-do; Joung-Kyou Park, Suwan, all of (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/133,523

(22) Filed: Aug. 13, 1998

(30) Foreign Application Priority Data

Aug. 28, 1997 (KR) .............................................. 97-41887

(51) Int. Cl.⁷ ............................. H04M 1/64; H04B 1/38
(52) U.S. Cl. ............................... 379/88.01; 379/88.03; 379/88.04; 455/563; 455/569
(58) Field of Search ............................. 379/258, 88.01, 379/352, 433, 430, 420, 424, 88.02, 88.03, 88.04, 88.07, 88.08; 455/462, 463, 557, 556, 552, 88, 418, 419, 420, 563, 569; 704/200, 258

(56) References Cited

U.S. PATENT DOCUMENTS

| 4,731,811 A | | 3/1988 | Dubus | |
|---|---|---|---|---|
| 5,042,063 A | * | 8/1991 | Sakanishi et al. | 379/88.03 |
| 5,222,121 A | * | 6/1993 | Shimada | 379/88.03 |
| 5,353,376 A | | 10/1994 | Oh et al. | |
| 5,371,779 A | | 12/1994 | Kobayashi | |
| 5,826,199 A | * | 10/1998 | Maeda | 455/563 |
| 5,864,603 A | * | 1/1999 | Haavisto et al. | 379/88.01 |
| 5,953,674 A | * | 9/1999 | Hutchinson, IV | 455/557 |
| 6,081,724 A | * | 6/2000 | Wilson | 455/462 |
| 6,226,532 B1 | * | 5/2001 | Kim et al. | 455/563 |

* cited by examiner

*Primary Examiner*—Fan Tsang
*Assistant Examiner*—Ovidio Escalante
(74) *Attorney, Agent, or Firm*—Dilworth & Barrese, LLP

(57) ABSTRACT

A method for managing voice registration entries of voice recognition apparatus for use in both a handset and a hands-free kit. In the method, it is determined whether the handset is set to a hands-free mode where the handset is mounted on a cradle, thus connecting with the hands-free kit. If the handset is set to the hands-free mode, a voice registration entry for the handset is compared with a voice registration entry for the hands-free kit to calculate an entry difference value therebetween. A voice recognition process is performed, if the entry difference value is a minimum value, e.g., substantially zero. If the entry difference is larger than the minimum value, then a voice entry is registered for the hands-free kit, in response to a user confirmation. If the entry difference is smaller than the minimum value, then the voice entry is registered for the handset, in response to a user confirmation.

17 Claims, 4 Drawing Sheets

| STORAGE AREA FOR INDEX (SA1) | STORAGE AREA FOR HANDSET (SA2) | | | | STORAGE AREA FOR HANDS-FREE KIT (SA3) | | | |
|---|---|---|---|---|---|---|---|---|
| | FEATURE #1 (SR1) | FEATURE #2 (SR2) | VOICE PLAYBACK DATA (SR3) | TEL NO (SR4) | FEATURE #1 (SR1) | FEATURE #2 (SR2) | VOICE PLAYBACK DATA (SR3) | TEL NO (SR4) |
| I1 | Fhs1 | Fhs2 | DAVID | 280-9697 | Fhf1 | Fhf2 | DAVID | 280-9697 |
| I2 | | | | | | | | |
| ⋮ | | | | | | | | |

| STORAGE AREA FOR INDEX (SA1) | STORAGE AREA FOR HANDSET (SA2) | | | | STORAGE AREA FOR HANDS-FREE KIT (SA3) | | | |
|---|---|---|---|---|---|---|---|---|
| | FEATURE #1 (SR1) | FEATURE #2 (SR2) | VOICE PLAYBACK DATA (SR3) | TEL NO (SR4) | FEATURE #1 (SR1) | FEATURE #2 (SR2) | VOICE PLAYBACK DATA (SR3) | TEL NO (SR4) |
| I1 | Fhs1 | Fhs2 | DAVID | 280-9697 | Fhf1 | Fhf2 | DAVID | 280-9697 |
| I2 | | | | | | | | |
| ... | | | | | | | | |

FIG. 2

METHOD AND APPARATUS FOR MANAGING VOICE REGISTRATION ENTRIES OF VOICE RECOGNITION APPARATUS FOR USE IN BOTH HANDSET AND HANDS-FREE KIT

BACKGROUND OF THE INVENTION

1. Field of the Invention

The present invention relates to a voice recognition method and apparatus in a digital portable telephone and, more particularly, to a method and apparatus for managing voice registration entries of a voice recognition apparatus for use in both a handset and a hands-free kit.

2. Description of the Related Art

In general, a voice recognition apparatus extracts features such as a frequency feature from an input voice signal to recognize the input voice. Typically, the voice recognition apparatus has a large number of voice signals to process, which may overload a microprocessor associated with the voice recognition apparatus. Hence, in a known voice recognition method for use with a portable telephone, a hands-free kit having a voice recognition function is provided. The voice recognition apparatus of the hands-free kit recognizes the voice signal associated with a telephone number that the user utters, and outputs the voice recognition results to the portable telephone (i.e., handset). Then, the handset dials the telephone number according to the voice recognition results received from the hands-free kit.

Since the voice recognition apparatus has a large number of voice signals to process and, as a result, can be rather large in size, it is difficult to install the voice recognition apparatus directly in a portable telephone. Further, unless the voice recognition apparatus can guarantee fast processing, the voice recognition apparatus may actually obstruct operation of the portable telephone.

In order to employ a voice recognition function in a hands-free kit, the hands-free kit requires, among other components, a digital signal processor (DSP). Also, a non-volatile memory such as an EEPROM (Electrically Erasable and Programmable Read Only Memory) is necessary. However, if the voice recognition apparatus is installed only in the hands-free kit, the voice recognition function can only be implemented through the hands-free kit. Thus, when separated from the hands-free kit, the portable telephone cannot perform a voice recognition function itself.

It is known that a typical portable telephone includes a vocoder. The problems mentioned above may be solved, if the portable telephone recognizes a voice using a packet data output from the vocoder. In this case, the digital portable telephone employing a vocoder may therefore include voice recognition apparatus. Thus, the digital portable telephone including the voice recognition apparatus, and having a hands-free kit associated therewith, can register and recognize the voices input from either the handset or the hands-free kit. However, in consideration of the different characteristics of microphones and audio amplifiers included respectively in the handset and the hands-free kit, the voice signals for the same words input respectively through the handset and the hands-free kit should be registered separately. That is to say, though the same word is uttered by the same person, the voice signal input through the handset may be different form the voice signal input through the hands-free kit, because of the different characteristics of the microphones and the audio amplifiers included respectively in the handset and the hands-free kit. Therefore, even though the same information is uttered by the same person, the respective voice recognition apparatus may recognize the voice signals, which are input through the handset and the hands-free kit, differently. That is, the respective voice recognition processes performed by the handset and the hands-free kit may yield different results.

Therefore, the voice recognition apparatus should separately register the same voices input through the handset and the hands-free kit, respectively. Further, it is necessary to maintain the same voice registration entries for the handset and the hands-free kit.

SUMMARY OF THE INVENTION

It is therefore an object of the present invention to provide a method and apparatus for managing voice registration entries such that a voice registration entry for a handset coincides with a voice registration entry for a hands-free kit.

To achieve the above and other objects, one aspect of the present invention provides a method for managing voice registration entries of a voice recognition apparatus for use in both a handset and a hands-free kit. In the method, it is determined whether the handset is set to a hands-free mode where the handset is mounted on a cradle, thus connecting with the hands-free kit. If the handset is set to the hands-free mode, a voice registration entry for the handset is compared with a voice registration entry for the hands-free kit to count the number difference of entries therebetween. A voice recognition process is performed, if the number difference is a minimum value, e.g., substantially zero. If the number difference is larger than the minimum value, then a voice entry is registered for the hands-free kit, in response to a user confirmation. If the entry difference is smaller than the minimum value, then a voice entry is registered for the handset, in response to a user confirmation.

These and other objects, features and advantages of the present invention will become apparent from the following detailed description of illustrative embodiments thereof, which is to be read in connection with the accompanying drawings in which the same reference numerals are used throughout the various figures to designate same or similar components.

BRIEF DESCRIPTION OF THE DRAWINGS

FIG. 2 is a diagram showing a memory map of a first memory according to an embodiment of the present invention;

DETAILED DESCRIPTION OF PREFERRED EMBODIMENTS

A preferred embodiment of the present invention will be described in detail hereinbelow with reference to the accompanying drawings. For comprehensive understanding of the present invention, the present invention will be illustratively described, with respect to specific embodiments. However, it should be noted that the present invention can be implemented by anyone skilled in the art with the description provided herein. In the following description, well-known functions or constructions which may obscure the present invention in unnecessary detail are not described in detail.

Figure 1:
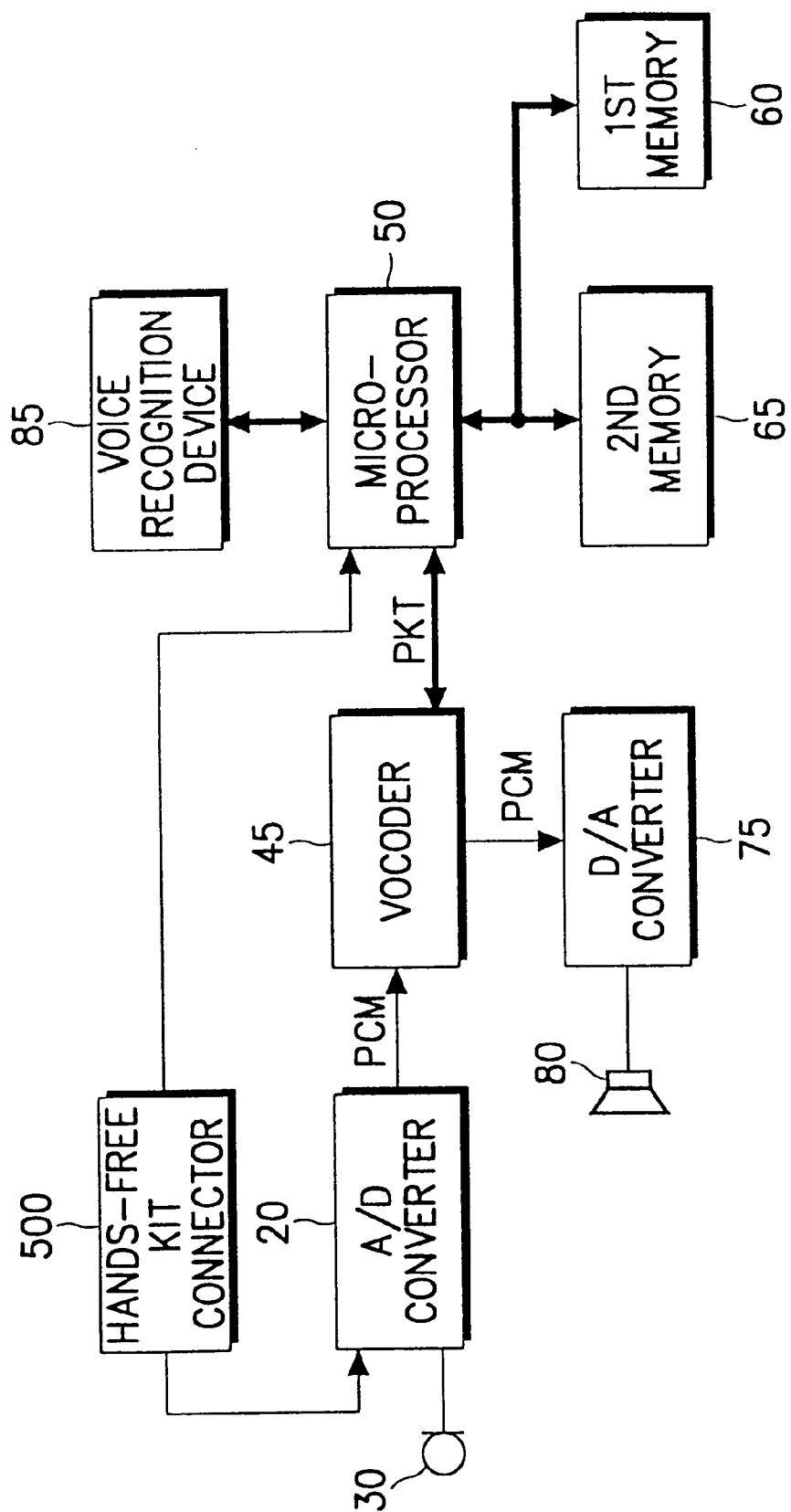
FIG. 1 is a block diagram of a digital portable telephone with voice recognition apparatus to which the present invention is applied.

FIG. 1 is a block diagram illustrating a digital portable telephone with a voice recognition apparatus to which the present invention is applied. Well known digital portable telephone circuitry, such as an RF (Radio Frequency) circuit and a DTMF (Dual Tone Multi-Frequency) circuit, is not shown as it is not critical to an understanding of the present invention.

Referring to FIG. 1, an analog voice signal input from a microphone 30 is converted to a digital PCM (Pulse Code Modulation) signal by an analog-to-digital (A/D) converter 20. A vocoder 45 compresses the PCM signal output from the A/D converter 20 and outputs packet data PKT. In a CDMA cellular telephone, the vocoder 45 can be realized by an 8 Kbps QCELP (Qualcomm Code Excited Linear Predictive coding) encoder, a 13 Kbps QCELP encoder or an 8 Kbps EVRC (Enhanced Variable Rate Coding) encoder, and in a GSM (Global System for Mobile Communications) cellular telephone, the vocoder 45 can be realized by an RPE-LTP (Regular Pulse Excitation with Long Term Prediction) encoder.

The packet data PKT output from the vocoder 45 is applied to a microprocessor 50 which controls an overall operation of the portable telephone. A first memory 60, which is a nonvolatile memory (e.g., a flash memory or EEPROM), stores a control program and initial service data. A second memory 65, which is RAM (Random Access Memory), temporarily stores data including packet data for input voice signals to be registered or recognized and various data generated during operation of the portable telephone. A voice recognition device 85 extracts feature data from the packet data for the input voice signals and outputs the feature data, preferably, at a transfer rate of 20 bytes/sec. The frequency feature and the intensity of the input voice signal are included in the feature data. It is to be understood that the feature data is used for voice recognition.

The voice recognition device 85 can be realized by either hardware or software. In the case where the voice recognition device 85 is realized by software, the software program for realizing the voice recognition device 85 can be stored in the first memory 60. The microprocessor 50 delivers the packet data PKT output from the vocoder 45 to the voice recognition device 85, and dials a telephone number according to index data output from the voice recognition device 85. Further, the microprocessor 50 stores, in an internal memory thereof, an address of the first memory 60 where the packet data output from the vocoder 45 is stored, and reads the packet data from the first memory 60, by using the address, when informing the user that his utterance is completely recognized. For convenience, the read packet data is called the voice playback data VP. The vocoder 45 converts the voice playback data VP to a PCM signal and applies it to a digital-to-analog (D/A) converter 75, which converts the input PCM signal to an analog signal and outputs the converted analog signal through a speaker 80. Instead of the voice playback data VP, a voice message informing completion of the voice recognition process may also be stored in the first memory 60 and output in a similar manner.

A hands-free kit connector 500 includes a cradle having a sensor for sensing whether the hands-free kit is installed in the cradle for the portable telephone handset. Further, the hands-free kit connector 500 includes a jack for connecting a signal path and a charging path between the hands-free kit and the handset. When the signal path is connected, the voice signal input from a microphone of the hands-free kit is applied to the A/D converter 20, which converts the input voice signal to a digital PCM signal and outputs the PCM signal to the vocoder 45. Further, the hands-free kit connector 500 is connected to a specific port of the microprocessor 50, so that the microprocessor 50 can determine whether the input voice signal is received from the microphone 30 of the portable telephone or from the microphone of the hands-free kit.

FIG. 2 shows a memory map of the first memory 60 according to an embodiment of the present invention. As illustrated, the first memory 60 includes a first storage area SA1 for the index data, a second storage area SA2 for voice information input from the handset, and a third storage area SA3 for voice information input from the hands-free kit. The second storage area SA2 is divided into a first storage region SR1 for the feature data Fhs1 input from the handset, a second storage region SR2 for the feature data Fhs2 input from the handset, a third storage region SR3 for the voice playback data VP input from the handset, and a fourth storage region SR4 for the telephone number input from the handset. Similarly, the third storage area SA3 is divided into a first storage region SR1 for the feature data Fhf1 input from the hands-free kit, a second storage region SR2 for the feature data Fhf2 input from the hands-free kit, a third storage region SR3 for the voice playback data VP input from the hands-free kit, and a fourth storage region SR4 for the telephone number input from the hands-free kit.

For example, the index data I1 includes addresses where the feature data Fhs1 and Fhs2 input from the handset and the feature data Fhf1 and Fhf2 input from the hands-free kit are stored, addresses where the telephone numbers input respectively from the handset and the hands-free kit are stored, and addresses where the voice playback data VPs input respectively from the handset and the hands-free kit are stored. As an alternative, instead of the first storage area SA1 for the index data, the portable telephone may include an address generator.

As illustrated, each of the second and third storage areas SA2 and SA3 includes first and second storage regions SR1 and SR2 for storing two sets of the feature data Fhs1, Fhs2, Fhf1 and Fhf2 extracted from the voice signals input from the handset and the hands-free kit, respectively. This is because the voice signals, though uttered by the same user, may be different from each other whenever the user speaks. Therefore, reference feature data is extracted twice for the same word that the user uttered, and stored in the two storage regions SR1 and SR2, separately.

Figure 3:
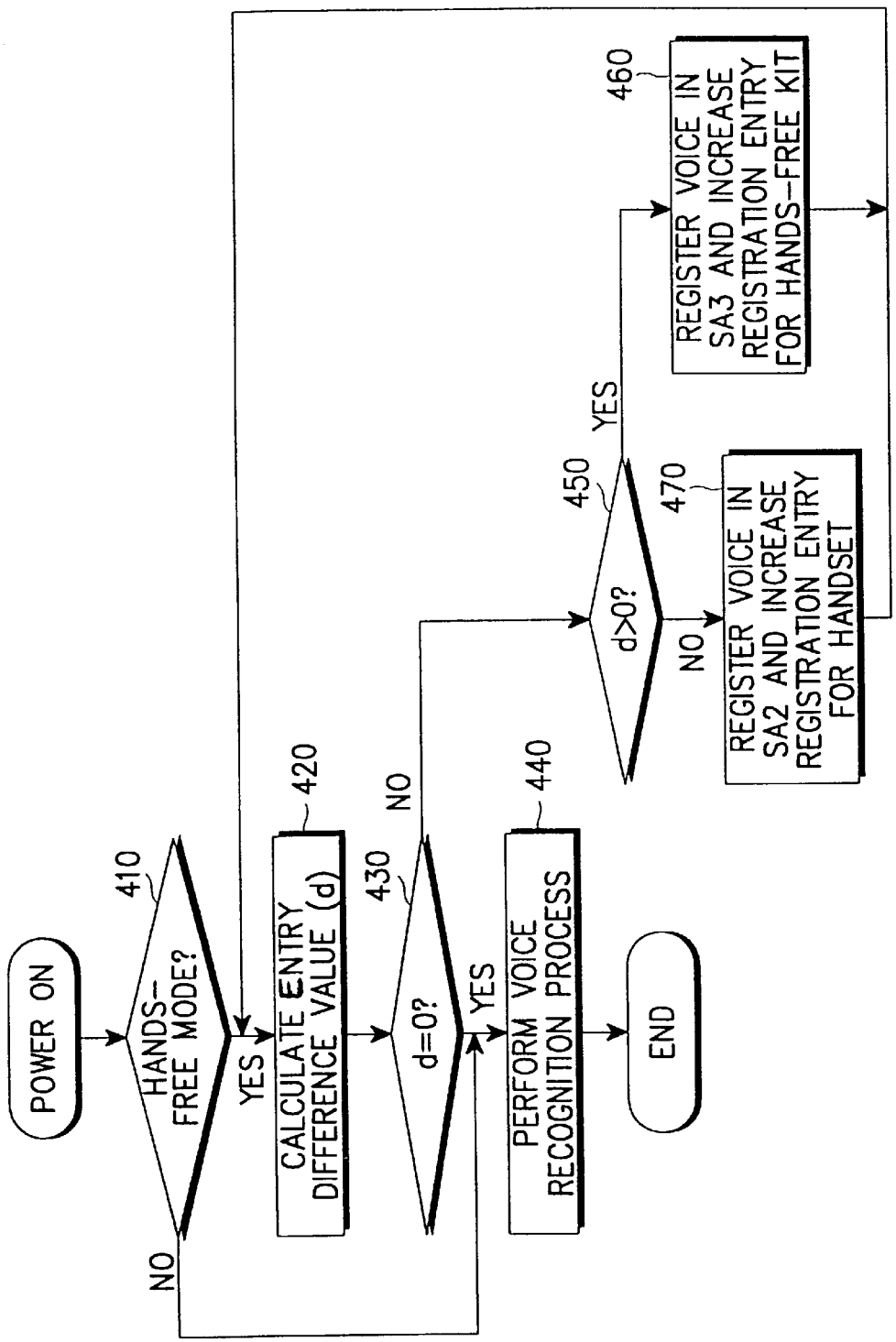
FIG. 3 is a flow chart illustrating management of voice registration entries of the voice recognition apparatus for use in both the handset and the hands-free kit according to an embodiment of the present invention.

FIG. 3 is a flow chart illustrating management of the voice registration entries of the voice recognition apparatus for use in both the handset and the hands-free kit according to the present invention. Referring to FIG. 3, the microprocessor 50 checks, in step 410, the hands-free kit connector 500 to see if the portable telephone is in a hands-free mode where the handset is mounted on the cradle, thus connecting with the hands-free kit through the jack. If the portable telephone is in the hands-free mode, the microprocessor 50 calculates, in step 420, an entry number difference "d" by subtracting a registration entry number for the hands-free kit from a registration entry number for the handset. A registration entry number is the total number of entries stored in each of the storage areas, SA2 and SA3. For example, there may be five (5) registered entries in SA2, indexed by I1 through I5, and three registered entries in SA3 indexed by I1 through I3. In this example, the registration entry number for SA2 would be 5, and the registration entry number for SA3 would be 3. In step 430, the microprocessor 50 checks whether the entry number difference "d" is zero or not. If it is zero, thus indicating that the number of entries in the hands-free kit storage area SA3 equals the number of entries in the handset storage area SA2, the microprocessor 50 goes on to perform the voice recognition process in step 440, thus ending the entry management process. However, if the entry number difference "d" is not zero, the microprocessor 50 checks, in step 450, whether the entry number difference "d" is larger than zero. If the value "d" is larger than zero, the microprocessor 50 registers the input voice information, a process that will be discussed below with respect to FIG. 4, in the third storage area SA3 in step 460, thus increasing the registration entry number for the hands-free kit by one, and returns to step 420. However, if the entry difference value "d" is smaller than zero, the microprocessor 50 registers the input voice information in the second storage area SA2 in step 470, thus increasing the registration entry number for the handset by one, and returns to step 420. Preferably, the user is prompted to confirm registration before such registration is performed, as will be explained. The process continues until "d" equals zero.

Figure 4:
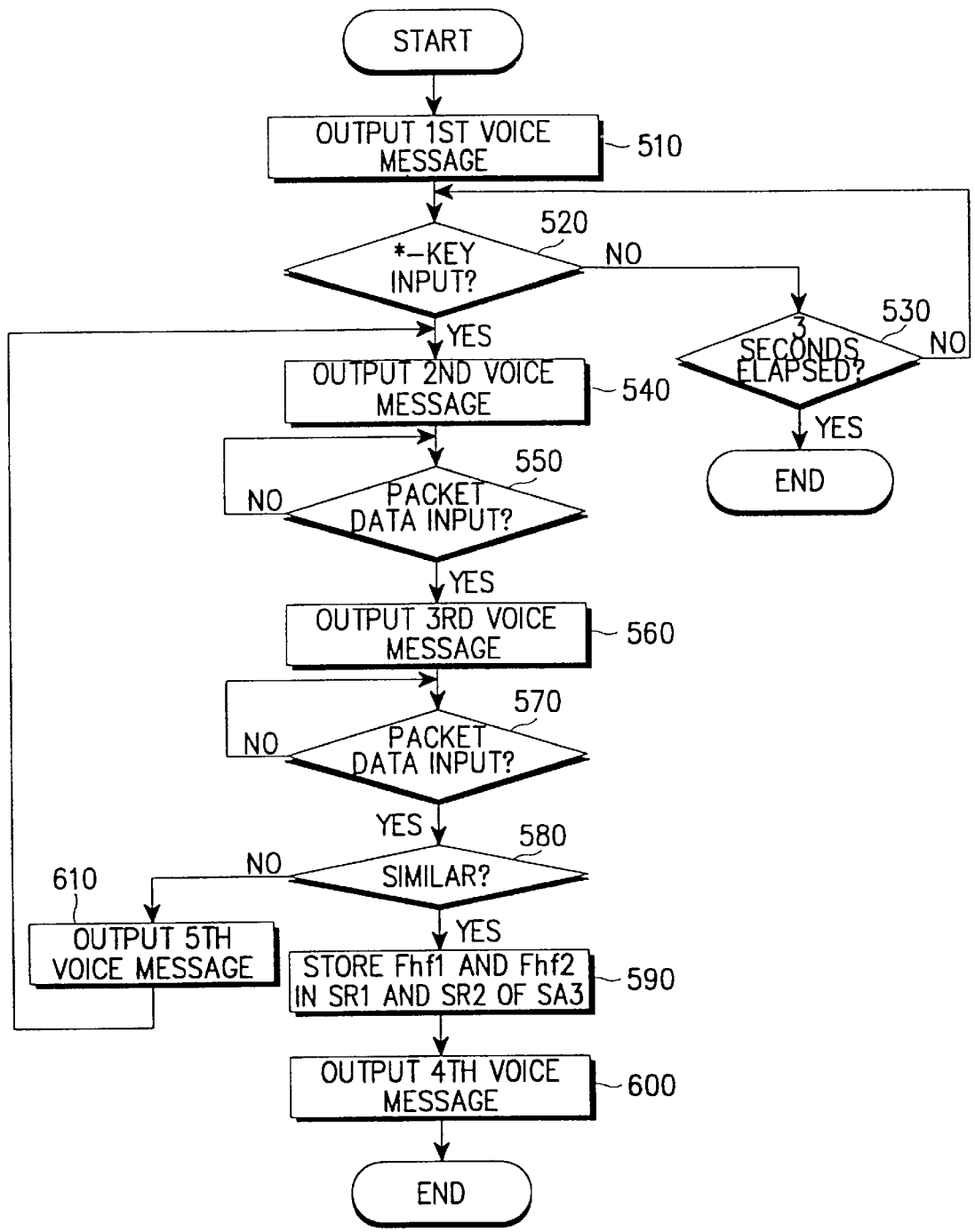
FIG. 4 is a flow chart illustrating registration of a voice in a storage area for the hands-free kit according to the present invention.

FIG. 4 is a flow chart illustrating registration or storage of the voice information or a voice registration entry in the third storage area SA3 according to the present invention. As shown in FIG. 2, each voice information or voice registration entry consists of its feature data, its voice playback data and its telephone number. The process of FIG. 4 is to have the voice registration entry for the hands-free kit coincide with the voice registration entry for the handset, in the case where the voice information registered in the second storage area SA2 is larger in number than the voice information registered in the third storage area SA3. In step 510, the microprocessor 50 outputs a first voice message, inquiring whether or not to register the voice information, to the speaker 80 through the D/A converter 75. Here, the first voice message may be "You have a name to register through the hands-free kit. If you want to register it, please press *-key". In step 520, the microprocessor 50 determines whether the *-key is pressed. If the *-key is not pressed, the microprocessor 50 determines, in step 530, whether a predetermined time (e.g., 3 seconds) has elapsed. If the predetermined time has elapse, the microprocessor 50 ends the program, judging that the user has no intention of registering the voice information for the unregistered name. If the predetermined time has not elapsed, the procedure returns to step 520 to check again whether the *-key is pressed.

In step 540, the microprocessor 50 outputs a second voice message assisting the user to register the voice information which was registered through the handset only, but not yet through the hands-free kit. For example, the second voice message may be "Please repeat the name after me. David". Here, the leading voice message "Please repeat the name after me" is read from a specified storage area in the first memory 60, and the following voice message "David" is read from the third storage region SR3 in the second storage area SA2 for the handset. At the sound of the second voice message, the user will repeat the name 'David' using the microphone in the hands-free kit. Then, the voice signal input from the microphone in the hands-free kit via the hands-free kit connector 500 is converted to the digital PCM signal by the A/D converter 20 and applied to the vocoder 45 which encodes the PCM signal and outputs the packet data PKT. Then, in step 550, the microprocessor 50 determines whether the packet data PKT is received from the vocoder 45. If the packet data PKT is received, the microprocessor 50, in step 560, outputs a third voice message requesting the user to utter the name again. For example, the third voice message may be "Please utter the name again". The microprocessor 50 checks, in step 570, whether the packet data PKT for the second uttered name is received from the vocoder 45. If the packet data PKT is received, the microprocessor 50 compares, in step 580, the feature data for the name input the first time with the feature data for the name input the second time by means of the voice recognition device 85. If the difference between the feature data for the name input the first time and the feature data for the name input the second time is smaller than a predetermined value, the microprocessor 50 determines that the two input names are similar to each other and, in step 590, stores the two names (i.e., the feature data Fhf1 and Fhf2) in the first and second storage regions, SR1 and SR2, in the third storage area SA3 of the first memory 60 by means of the voice recognition device 85. After that, in step 600, the microprocessor 50 outputs a fourth voice message informing completion of the registration of the voice information (e.g., "Voice registration is completed"). However, if feature data of the two input names are not similar to each other, in the step 580, the microprocessor 50 outputs a fifth voice message, in step 610, informing that the first input name is different from the second input name (i.e., difference is larger than a predetermined value). For example, the fifth voice message may be "The names that you uttered are different from each other. Please, register the name again"). Thereafter, step 610 returns to step 540.

It is to be appreciated that the process for registering voice information in the second storage area SA2 for the handset is preferably implemented in the exact same manner as described above with respect to the hands-free kit. Such a process is performed to have the voice registration entry for the handset coincide with the voice registration entry for the hands-free kit, in case that the sets of the voice information registered in the third storage area SA3 is larger in number than the sets of the voice information registered in the second storage area SA2.

As described above, the portable telephone of the invention can assist the user to always maintain the same voice registration entries for the handset and the hands-free kit.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for managing voice registration entries of voice recognition apparatus for use in both a handset and a hands-free kit, comprising the steps of:

determining whether the handset is set to a hands-free mode where the handset is mounted on a cradle, thus connecting with the hands-free kit;

comparing a registration entry number for the handset with a registration entry number for the hands-free kit to calculate an entry number difference value therebetween, if the handset is set to the hands-free mode;

performing a voice recognition process if the entry number difference value is substantially zero; and registering a voice entry for the hands-free kit, in response to a user confirmation, if the entry number difference value is larger than zero.

2. The method of claim 1, wherein said registering step further comprises the steps of:
   outputting a first voice message inquiring whether or not to register said voice entry in a storage area for the hands-free kit, and waiting for a user's response thereto;
   upon receipt of the user's response, playing back said voice entry and outputting a second voice message requiring the user to repeat the played back voice entry; and
   recognizing voice entry input by the user in response to the second voice message, and registering the input voice entry in the storage area for the hands-free kit.

3. The method of claim 1, wherein said registering step further comprises the steps of:
   outputting a first voice message inquiring whether or not to register said voice entry in a storage area for the hands-free kit, and waiting for a user's response thereto;
   upon receipt of the user's response, playing back said voice entry and outputting a second voice message requiring the user to repeat the played back voice entry;
   recognizing voice entry input by the user in response to the second voice message, outputting a third voice message requiring the user to utter the voice entry again, recognizing the voice entry uttered again by the user, and comparing the first input voice entry with the second input voice entry to calculate a difference value therebetween; and
   comparing said difference value with a predetermined value, and registering the first and second input voice entries in the storage area for the hands-free kit, if the difference value is smaller than the predetermined value.

4. The method of claim 3, further comprising the step of outputting a fourth voice message informing completion of the voice registration, after registering the voice entries.

5. The method of claim 3, further comprising the step of outputting a fifth voice message requiring the user to register the voice entry again, if the difference value is greater than the predetermined value.

6. The method of claim 1, further comprising the step of registering a voice entry for the handset, in response to a user confirmation, if the difference value is smaller than zero.

7. The method of claim 6, wherein said registering step further comprises the steps of:
   outputting a first voice message inquiring whether or not to register said voice entry in a storage area for the handset, and waiting for a user's response thereto;
   upon receipt of the user's response, playing back said voice entry and outputting a second voice message requiring the user to repeat the played back voice entry; and
   recognizing voice entry input by the user in response to the second voice message, and registering the input voice entry in the storage area for the handset.

8. The method of claim 6, wherein said registering step further comprises the steps of:
   outputting a first voice message inquiring whether or not to register said voice entry in a storage area for the handset, and waiting for a user's response thereto;
   upon receipt of the user's response, playing back said voice entry and outputting a second voice message requiring the user to repeat the played back voice entry;
   recognizing voice entry input by the user in response to the second voice message, outputting a third voice message requiring the user to utter the voice entry again, recognizing the voice entry uttered again by the user, and comparing the first input voice entry with the second input voice entry to calculate a difference value therebetween; and
   comparing said difference value with a predetermined value, and registering the first and second input voice entries in the storage area for the handset, if the difference value is smaller than the predetermined value.

9. The method of claim 8, further comprising the step of outputting a fourth voice message informing completion of the voice registration, after registering the voice entries.

10. The method of claim 8, further comprising the step of outputting a fifth voice message requiring the user to register the voice entry again, if the difference value is greater than the predetermined value.

11. A method for managing voice registration entries of voice recognition apparatus for use in both a handset and a hands-free kit, the method comprising the steps of:
    determining whether the handset is set to a hands-free mode where the handset is mounted on a cradle;
    comparing a registration entry number for the handset with a registration entry number for the hands-free kit to calculate an entry number difference value therebetween, if the handset is set to the hands-free mode;
    performing a voice recognition process, if the entry number difference value is substantially zero; and
    registering a voice entry for the handset, in response to a user confirmation, if the entry number difference value is smaller than zero.

12. The method of claim 11, wherein said registering step further comprises the steps of:
    outputting a first voice message inquiring whether or not to register said voice entry in a storage area for the handset, and waiting for a user's response thereto;
    upon receipt of the user's response, playing back said voice entry and outputting a second voice message requiring the user to repeat the played back voice entry; and
    recognizing voice entry input by the user in response to the second voice message, and registering the input voice entry in the storage area for the handset.

13. The method of claim 11, wherein said registering step further comprises the steps of:
    outputting a first voice message inquiring whether or not to register said voice entry in a storage area for the handset, and waiting for a user's response thereto;
    upon receipt of the user's response, playing back said voice entry and outputting a second voice message requiring the user to repeat the played back voice entry;
    recognizing voice entry input by the user in response to the second voice message, outputting a third voice message requiring the user to utter the voice entry again, recognizing the voice entry uttered again by the user, and comparing the first input voice entry with the second input voice entry to calculate a difference value therebetween; and
    comparing said difference value with a predetermined value, and registering the first and second input voice entries in the storage area for the handset, if the difference value is smaller than the predetermined value.

14. The method of claim 13, further comprising the step of outputting a fourth voice message informing completion of the voice registration, after registering the voice entries.

15. The method of claim 13, further comprising the step of outputting a fifth voice message requiring the user to register the voice entry again, if the difference value is greater than the predetermined value.

16. Apparatus for managing voice registration entries of voice recognition apparatus for use in both a handset and a hands-free kit, the apparatus comprising:

- means for determining whether the handset is set to a hands-free mode where the handset is mounted on a cradle, thus connecting with the hands-free kit;
- means for comparing a registration entry number for the handset with a registration entry number for the hands-free kit to calculate an entry number difference value therebetween, if the handset is set to the hands-free mode;
- means for performing a voice recognition process if the entry number difference value is substantially zero; and
- means for registering a voice entry for the hands-free kit, in response to a user confirmation, if the entry number difference value is larger than zero.

17. Apparatus for managing voice registration entries of voice recognition apparatus for use in both a handset and a hands-free kit, the apparatus comprising:

- means for determining whether the handset is set to a hands-free mode where the handset is mounted on a cradle;
- means for comparing a registration entry number for the handset with a registration entry number for the hands-free kit to calculate an entry difference value therebetween, if the handset is set to the hands-free mode;
- means for performing a voice recognition process, if the entry number difference value is substantially zero; and
- means for registering a voice entry for the handset, in response to a user confirmation, if the entry number difference value is smaller than zero.

* * * * *

UNITED STATES PATENT AND TRADEMARK OFFICE
CERTIFICATE OF CORRECTION

PATENT NO.    : 6,366,649 B1
DATED         : April 2, 2002
INVENTOR(S)   : Kyung-Joon Chun et al.

It is certified that error appears in the above-identified patent and that said Letters Patent is hereby corrected as shown below:

<u>Title page,</u>
Item [75], should read as follows:
-- Kyung-Joon Chun, Seoul; Seo-Yong Chin, Kyonggi-do; Joung-Kyou Park, Suwon-shi, all of (KR) --

Signed and Sealed this

Twenty-fourth Day of September, 2002

*Attest:*

*Attesting Officer*

JAMES E. ROGAN
*Director of the United States Patent and Trademark Office*